United States Patent
Goleski et al.

(10) Patent No.: US 9,011,289 B2
(45) Date of Patent: Apr. 21, 2015

(54) TRANSMISSION CLUTCH ASSEMBLY

(71) Applicant: Ford Global Technologies, LLC, Dearborn, MI (US)

(72) Inventors: Gregory Daniel Goleski, Rochester Hills, MI (US); Bradley Ronald Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 13/714,929

(22) Filed: Dec. 14, 2012

(65) Prior Publication Data

US 2014/0166422 A1   Jun. 19, 2014

(51) Int. Cl.
*F16H 3/62* (2006.01)
*F16H 3/44* (2006.01)
*F16D 47/04* (2006.01)
*F16D 41/04* (2006.01)
*F16D 25/061* (2006.01)
*F16D 41/12* (2006.01)

(52) U.S. Cl.
CPC .............. *F16D 25/061* (2013.01); *F16D 41/12* (2013.01); *F16D 47/04* (2013.01)

(58) Field of Classification Search
None
See application file for complete search history.

(56) References Cited

U.S. PATENT DOCUMENTS

| | | | |
|---|---|---|---|
| 7,052,430 B2 * | 5/2006 | Stevenson et al. | 475/278 |
| 7,100,466 B2 | 9/2006 | Naude | |
| 7,114,585 B2 | 10/2006 | Man et al. | |
| 2004/0180752 A1 * | 9/2004 | Haka | 475/303 |
| 2008/0047798 A1 * | 2/2008 | Wittkopp et al. | 192/53.34 |
| 2010/0018812 A1 | 1/2010 | Louis | |
| 2010/0140042 A1 | 6/2010 | Elliott | |
| 2011/0155530 A1 * | 6/2011 | Vierk et al. | 192/48.6 |

* cited by examiner

*Primary Examiner* — Justin Holmes
*Assistant Examiner* — Timothy Hannon
(74) *Attorney, Agent, or Firm* — James Dottavio; Brooks Kushman P.C.

(57) ABSTRACT

A clutch assembly is disclosed that combines a positively engaging dog clutch and one way clutch. The two devices are design such that the one way clutch never interferes with the engagement or disengagement of the dog clutch. In one embodiment, the one way clutch transmits torque in particular rotational positions and the dog teeth are circumferentially placed such that they do not engage in any of these positions. In another embodiment, the dog clutch piston, to which the teeth are secured, is permitted to rotate enough to accommodate any interference between dog teeth during engagement. In either embodiment, the teeth faces that transmit torque in the same direction as the one way clutch may be angled such that torque in that direction tends to disengage the dog clutch.

11 Claims, 7 Drawing Sheets

TRANSMISSION CLUTCH ASSEMBLY

TECHNICAL FIELD

This disclosure relates to the field of automatic transmissions for motor vehicles. More particularly, the disclosure pertains to a clutch assembly combining a positively engaging dog clutch with a passive one way clutch.

BACKGROUND

Many vehicles are used over a wide range of vehicle speeds, including both forward and reverse movement. Some types of engines, however, are capable of operating efficiently only within a narrow range of speeds. Consequently, transmissions capable of transmitting power at a variety of speed ratios are frequently employed. Many vehicular transmissions utilize a collection of clutches and establish particular speed ratios by engaging a subset of these clutches. The disengaged clutches, however, may exert some parasitic drag torque. Due to the power loss associated with these disengaged clutches, the engine must develop additional power, increasing fuel consumption. Transmission clutches which exert lower drag torque in the disengaged state, therefore, improve fuel efficiency. Low drag clutches will not be adopted, however, if they interfere with the ability to reliably and smoothly transition among speed ratios.

SUMMARY

A transmission is disclosed including a planetary element, such as a sun gear, ring gear, or planet carrier, configured to rotate about an axis, a dog clutch configured to positively prevent rotation of the planetary element in one direction, and a one way clutch configured to prevent rotation of the element in the opposite direction. The dog clutch includes a piston which slides axially to positively engage the element. The one way clutch is configured not to resist the sliding motion of the piston. The transmission may include a hydraulic cylinder to move the piston from a disengaged position into an engaged position and a return spring to move the piston back to the disengaged position. The positive engagement may occur between a plurality of teeth secured to the planetary element and a plurality of teeth secured to the piston. The dog clutch teeth may have angled faces arranged to transmit torque in the same direction as the one way clutch such that such torque tends to force the piston toward the disengaged position. The one way clutch may be of a type which transmits torque only when the planetary element is in one of a finite number of rotational positions and the dog teeth are circumferentially located such that the piston is free to slide between the engaged and disengaged axial positions when the planetary element is in any one of these rotational positions. The piston may be rotationally positioned within a housing by a spline connection which permits some rotation of the piston and a bias spring which forces the piston to a particular rotational position in the absence of other forces.

A clutch assembly is disclosed including first and second races, a piston configured to slide axially to positively engage the races to prevent relative rotation in one direction, and a one way clutch configured to prevent relative rotation in the opposite direction. The positive engagement may occur between dog teeth secured to the first race and dog teeth secured to the piston, the piston being secured against rotation relative to the second race. The dog clutch teeth may have angled faces arranged to transmit torque in the same direction as the one way clutch such that such torque tends to force the piston toward the disengaged position. In some embodiments, one of the races may be held against rotation. In other embodiments, both races may be supported for rotation about a common axis.

A method is disclosed for operating a transmission having a dog clutch and a one way clutch. The transmission is operated in a first forward ratio with the one way clutch transmitting torque. In this condition, the dog clutch is engaged such that the transmission may be operated in reverse with the dog clutch transmitting torque. Also in this condition, the dog clutch may be disengaged such that the transmission may shift into a second forward ratio.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
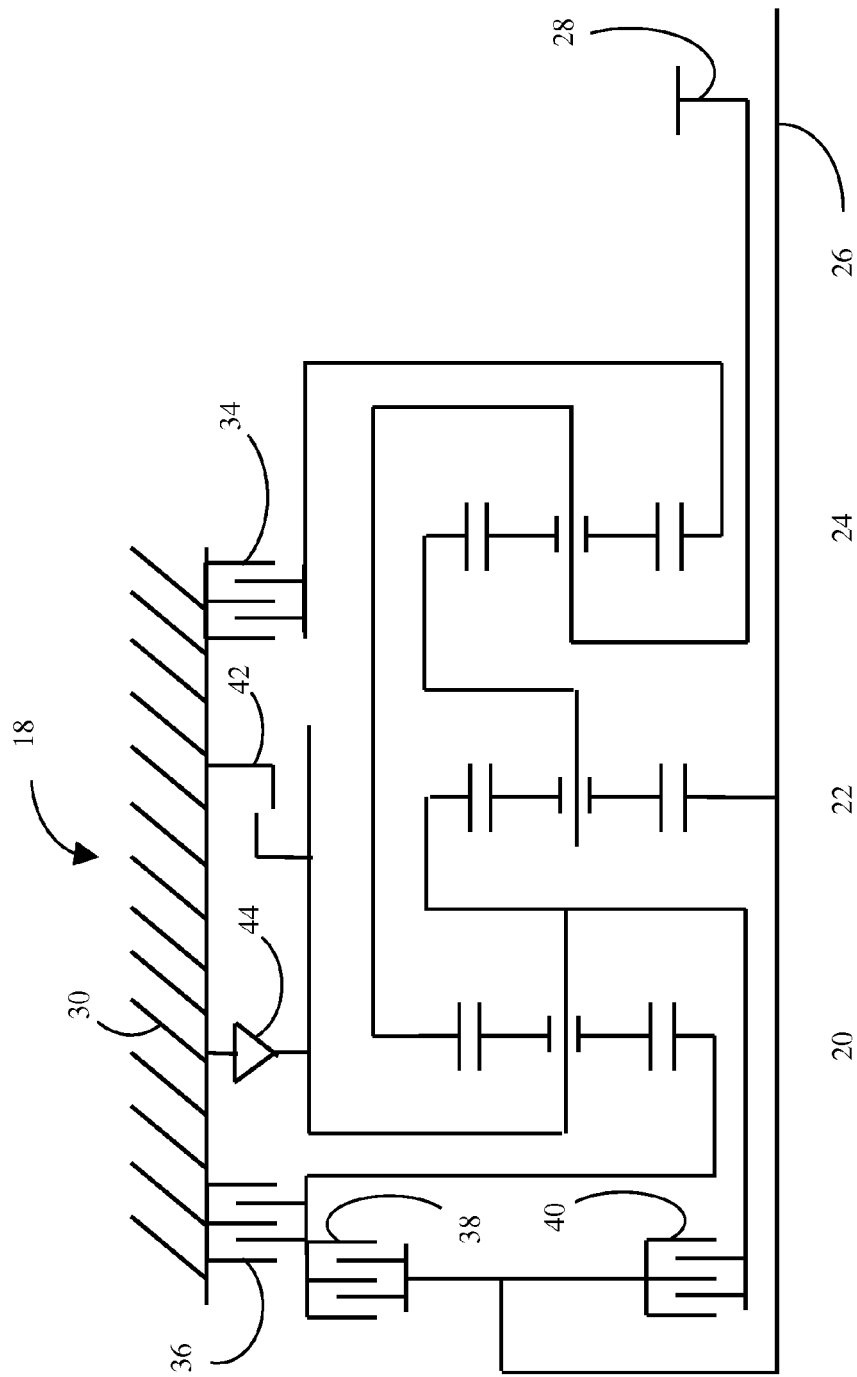
FIG. 1 is a schematic diagram of a transmission gearing arrangement.

A transmission 18 is illustrated schematically in FIG. 1. Three planetary gear sets 20, 22, and 24 each have a sun gear, a ring gear, a carrier, and a set of planet gears supported on the carrier and meshing with the sun and ring gear. The sun gear of gear set 22 is fixed to input shaft 26. The ring gear of gear set 20 and the carrier of gear set 24 are fixed to one another and also to output gear 28. The carrier of gear set 20 is fixed to the ring gear of gear set 22 and the carrier of gear set 22 is fixed to the ring gear of gear set 24.

A collection of clutches and brakes selectively couple various gear elements to either input shaft 26 or to transmission case 30. Brake 34 selectively couples the sun gear of gear set 24 to transmission case 30. Brake 36 selectively couples the sun gear of gear set 20 to transmission case 30. Clutch 38 selectively couples the sun gear of gear set 20 to input shaft 26. Clutch 40 selectively couples the combination of the carrier of gear set 20 and the ring gear of gear set 22 to input shaft 26. Brakes 34 and 36 and clutches 38 and 40 may be multi-plate friction clutches having friction plates coupled to one element interleaved with separator plates coupled to the opposite element. The clutches are actively engaged by a controller which supplies pressurized fluid to a hydraulic piston which acts to squeeze the interleaved plates together.

When the hydraulic pressure is released, a return spring forces the piston back and the selectively coupled elements are free to rotate with respect to one another. However, the interleaved plates remain close enough to one another to exert some frictional forces resulting in parasitic drag. The magnitude of the parasitic drag depends upon the size and number of friction plates. The size and number of friction plates required depends upon the torque that must be transmitted by the clutch when it is engaged. Therefore, clutches that must transmit large torques when engaged are likely to produce more parasitic drag when they are disengaged.

Dog clutch 42 selectively couples the carrier of gear set 20 and the ring gear of gear set 22 to transmission case 30. Dog clutches do not rely on friction. Instead, a dog clutch relies on positive engagement of elements to restrict relative rotation. A dog clutch has two sets of dog teeth, one coupled to each selectively coupled element. When the dog clutch is disengaged, the teeth are axially separated so that they do not prevent relative rotation of the elements. When a dog clutch is engaged, the teeth are intermeshed such that relative rotation is restrained, although there may be a slight amount of lash. One set of dog teeth may be mounted on a piston that is restrained from rotating with respect to one of the elements but permitted to slide axially. The axial position may be adjusted by a controller by supplying pressurized fluid. In some embodiments, a return spring may force the piston to move in the opposite direction when the fluid pressure is removed. For a given torque capacity, dog clutches typically produce much lower parasitic drag when disengaged than friction clutches. However, dog clutches have some limitations. If the dog teeth are not properly lined up with respect to one another, then some relative rotation may be necessary before engagement is possible. In certain applications, this may be accomplished by shaping the points of the teeth such that moving the teeth into engagement axially forces them to rotate into alignment. Also, when a dog clutch is transmitting torque, the contact forces between the teeth result in a frictional force that resist sliding motion of the piston. Therefore, attempts to disengage the dog clutch while it is transmitting torque may fail.

One way clutch 44 passively restrains the carrier of gear set 20 and the ring gear of gear set 22 from rotating in a reverse direction while allowing rotation in a positive direction. A variety of different one way clutch designs are known. Some one way clutch designs may allow some lash, a slight rotation in the reverse direction, before the one way clutch exerts torque to stop the rotation. Use of a one way clutch may offer several advantages over a friction clutch including lower drag when disengaged and improved shift quality by eliminating the need for active control during shifts.

As illustrated in Table 1, the clutches and brakes of transmission 18 are engaged in combinations of two to establish a variety of speed ratios between input shaft 26 and output gear 28. In 1st gear, torque may be transmitted by either dog clutch 44 or one way clutch 42. However, dog clutch 42 must be disengaged before the shift to 2nd gear can be completed. As discussed above, attempts to disengage a dog clutch when the dog clutch is transmitting torque may fail. Consequently, there is a need to ensure that the piston for dog clutch 44 can slide from the engaged position to the disengaged position while in 1st gear. Dog clutch 42 must be engaged before a shift from 1st gear to reverse because one way clutch 42 cannot transmit torque in the correct direction for reverse. As discussed above, some relative rotation may be required as the dog clutch piston slides from the disengaged position to the engaged position. Consequently, there is a need to ensure that the one way clutch will not preclude any necessary rotation.

TABLE 1

|  | 34 | 36 | 38 | 40 | 42/44 |
|---|---|---|---|---|---|
| Reverse |  |  | X |  | X |
| 1st | X |  |  |  | X |
| 2nd | X | X |  |  |  |
| 3rd | X |  | X |  |  |
| 4th | X |  |  | X |  |
| 5th |  |  |  | X | X |
| 6th |  | X |  |  | X |

Figure 2:
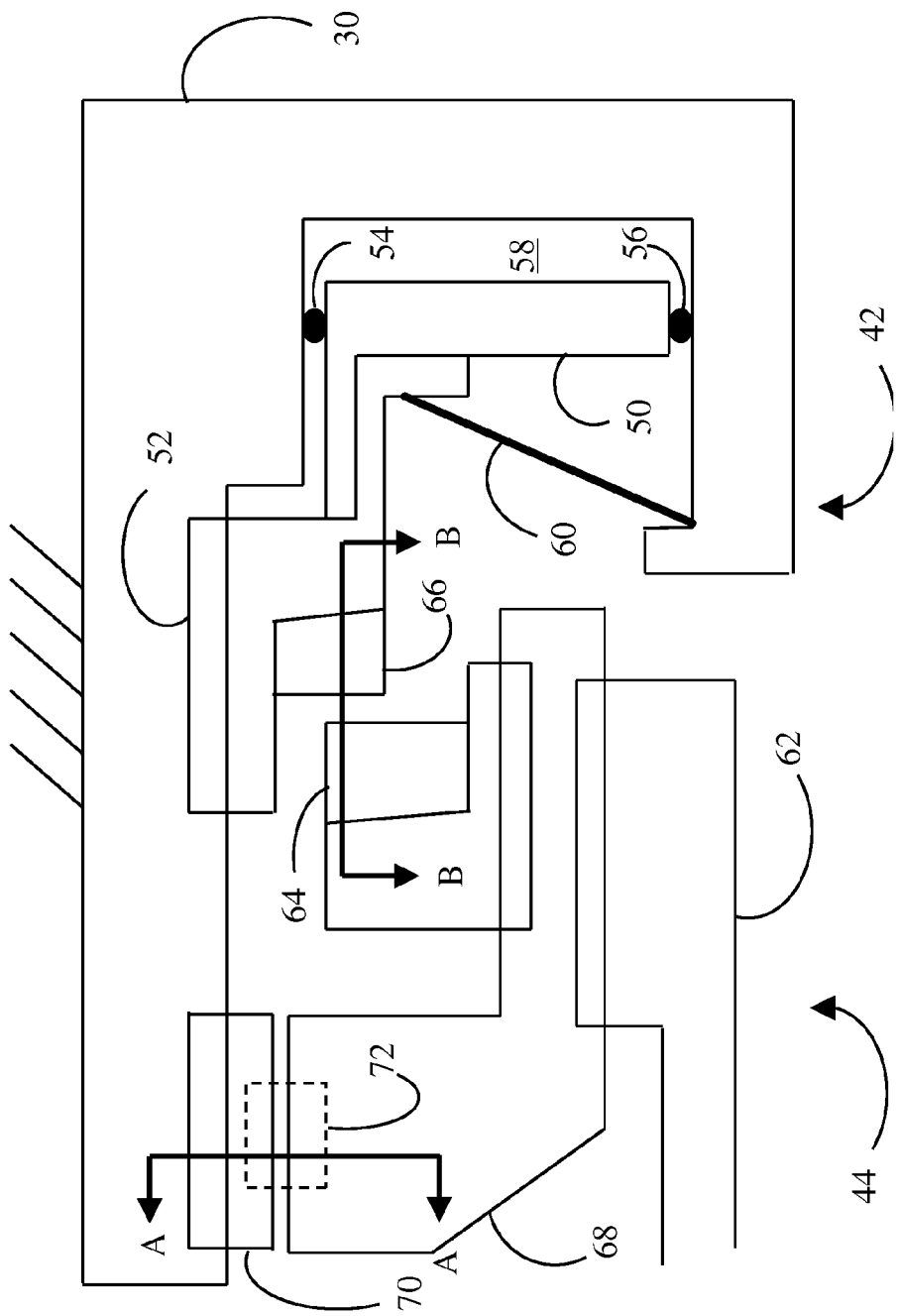
FIG. 2 is a cross sectional view of a clutch assembly.

FIG. 2 shows a cross section view of dog clutch 42 and one way clutch 44 according to one exemplary embodiment. Piston 50 slides axially with respect to transmission case 30 but is restrained from rotation by splines 52. Seals 54 and 56 create a cavity 58 such that pressurized fluid forces the piston to slide to the left. When the pressure is relieved, return spring 60 forces the piston to slide to the right. Alternatively or additionally, a second cavity may be formed in transmission case 30 such that a second source of pressurized fluid actively forces the piston to slide to the right. In FIG. 2, the piston is shown in the disengaged position. Shell 62 is fixed to the carrier of gear set 20 and the ring gear of gear set 22. A set of dog teeth 64 is fixed to shell 62. Another set of dog teeth 66 is fixed to the piston such that the two sets of teeth are forced together when piston 50 slides left into an engaged position. One way clutch inner race 68 is fixed to shell 62 while one way clutch outer race 70 is fixed to transmission case 30. A set of rockers 72 is supported in inner race 68 such that they engage slots in outer race 70 to preclude rotation in one direction while allowing rotation in the opposite direction.

Figure 3:
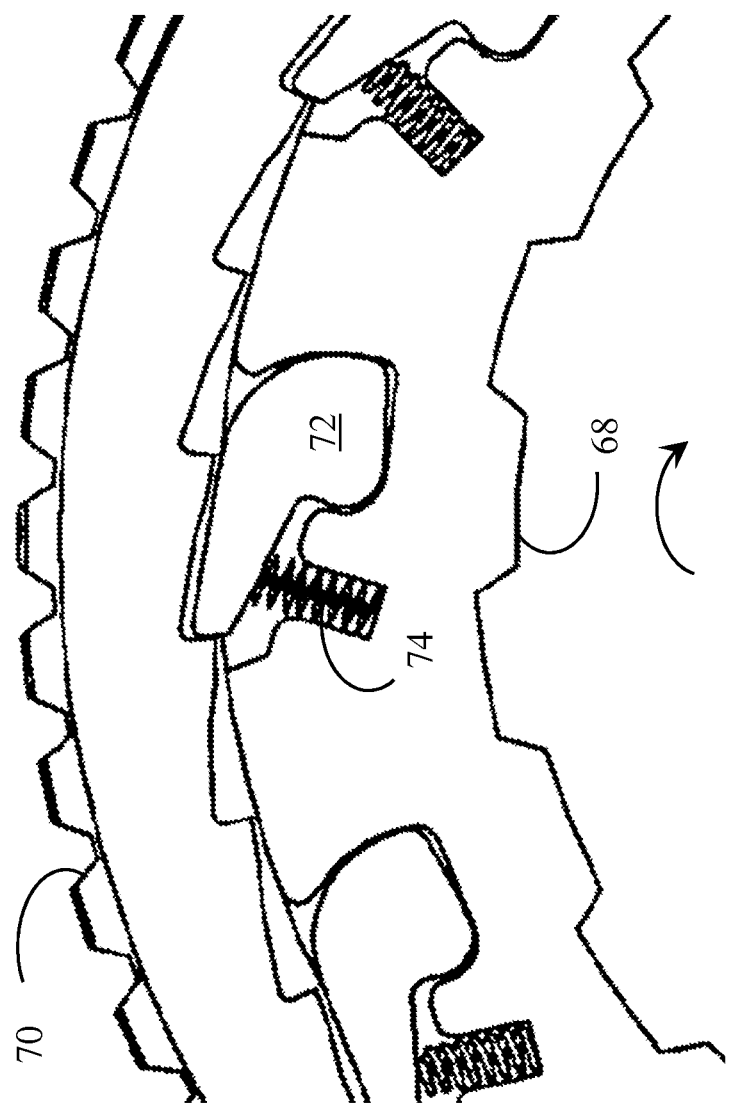
FIG. 3 is an end view of a one way clutch suitable for use within the clutch assembly of FIG. 2.

FIG. 3 shows an end view of an exemplary embodiment of one way clutch 44 in an engaged position. Spring 74 holds rocker 72 in the slot in outer race 70. In this position, rocker 72 precludes inner race 68 from rotating in a negative (counter-clockwise) direction. However, when inner race 68 rotates in a positive (clockwise) direction, the shape of the slots force the rocker to "rock" within inner race 68 allowing rotation. Once rotating in a positive direction, if the inner race comes to a stop and reverses direction, it will rotate just far enough in the negative direction for a rocker to catch in the next slot. When subjected to torque in the negative direction, the inner race will come to a stop in one of a finite number of predictable rotational positions.

Figure 4:
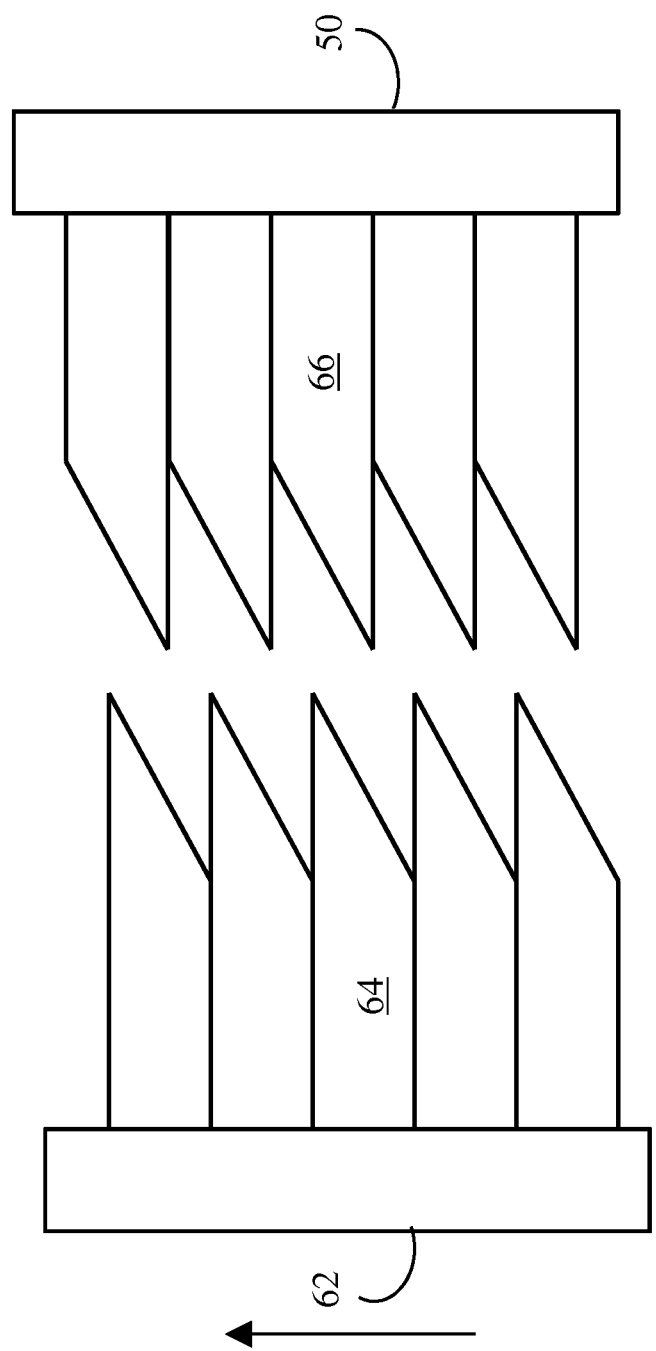
FIG. 4 is a top view of a dog clutch suitable for use within the clutch assembly of FIG. 2 in a disengaged condition.

FIG. 4 shows a top view of the dog clutch teeth when the dog clutch is disengaged and the one way clutch is engaged. Due to the axial separation, the dog teeth would not impede relative rotation in either direction. The circumferential position of the teeth may be designed such that the tips of teeth 64 will never line up with the tips of teeth 66 when the two races are in any of the rotational positions in which the one way clutch can transmit torque. Consequently, the piston can slide into the partially engaged position shown in FIG. 5 without any contact between teeth. If the torque on shell 62 reverses direction while the piston is in this partially engaged position, the flat sides of teeth 64 will come into contact with the flat sides of teeth 66 and be restrained from further rotation. Such a torque reversal could occur, for example, because the transmission is shifted from forward into reverse or because the vehicle is coasting and using engine compression to slow down (engine braking).

Figure 5:
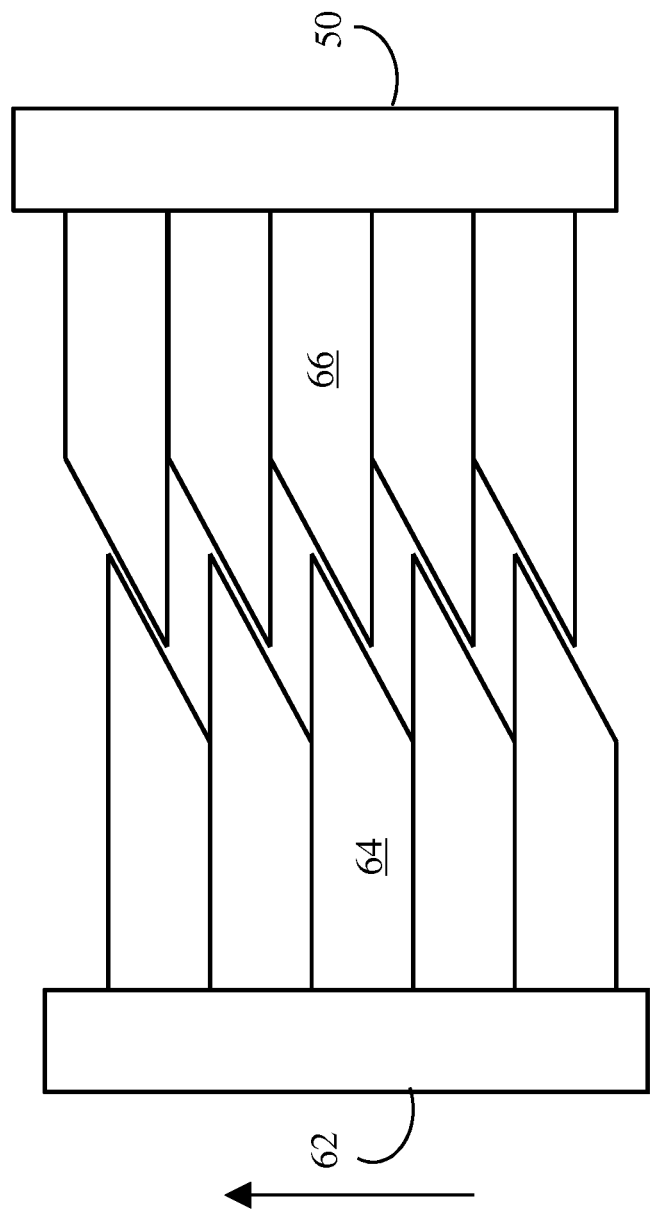
FIG. 5 is a top view of a dog clutch suitable for use within the clutch assembly of FIG. 2 in a partially engaged condition.
Figure 6:
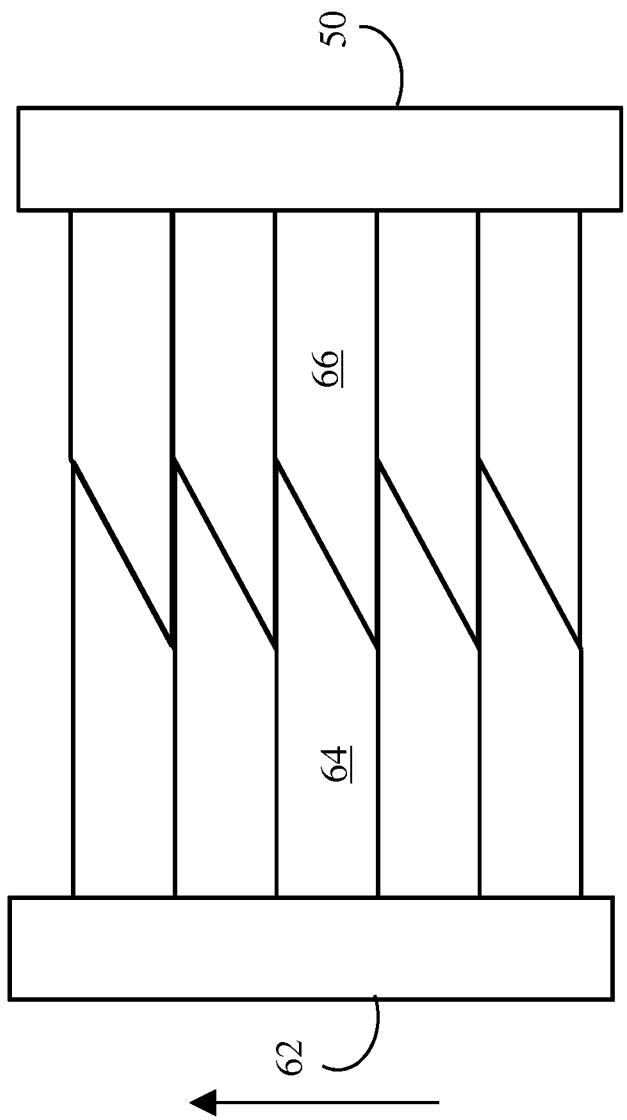
FIG. 6 is a top view of a dog clutch suitable for use within the clutch assembly of FIG. 2 in a fully engaged condition.

When the piston is in the partially engaged position shown in FIG. 5, hydraulic pressure in cavity 58 will transfer the torque from the one way clutch to the dog clutch. As the angled sides of teeth 66 are forced into the angled sides of teeth 64, the circumferential component of the force on teeth 64 reduces the force on rockers 72. Once the force on the rockers decreases to zero, any additional force will cause shell 62 to rotate as the angled sides of teeth 66 slide along the angled sides of teeth 64 into the fully engaged position shown in FIG. 6. As in the partially engaged position, any reversal of the torque on shell 62 causes the flat sides of the teeth to come into contact and restrain further rotation. Unlike the condition of FIG. 5, however, shell 62 does not rotate through a lash zone before the dog clutch restrains the rotation.

To disengage dog clutch 42 while the transmission is transmitting positive torque in 1st gear, hydraulic pressure is removed and return spring 60 forces the piston to return to the disengaged axial position. Between the fully engaged position and the partially engaged position, the dog clutch may be transmitting torque via forces between the angled sides of the teeth. The axial component of this force acts to assist the return spring in forcing the piston toward the disengaged position. Friction between the teeth resists the motion. The relationship between the disengaging force and the friction force depends upon the tangent of the pressure angle and the coefficient of friction. If the angle is sufficiently steep relative to the coefficient of friction, then the axial component of the normal force will be greater that the frictional force. Between the partially engaged position and the disengaged position, the one way clutch transmits all of the torque and no contact between teeth impedes the axial motion of the piston.

Figure 7:
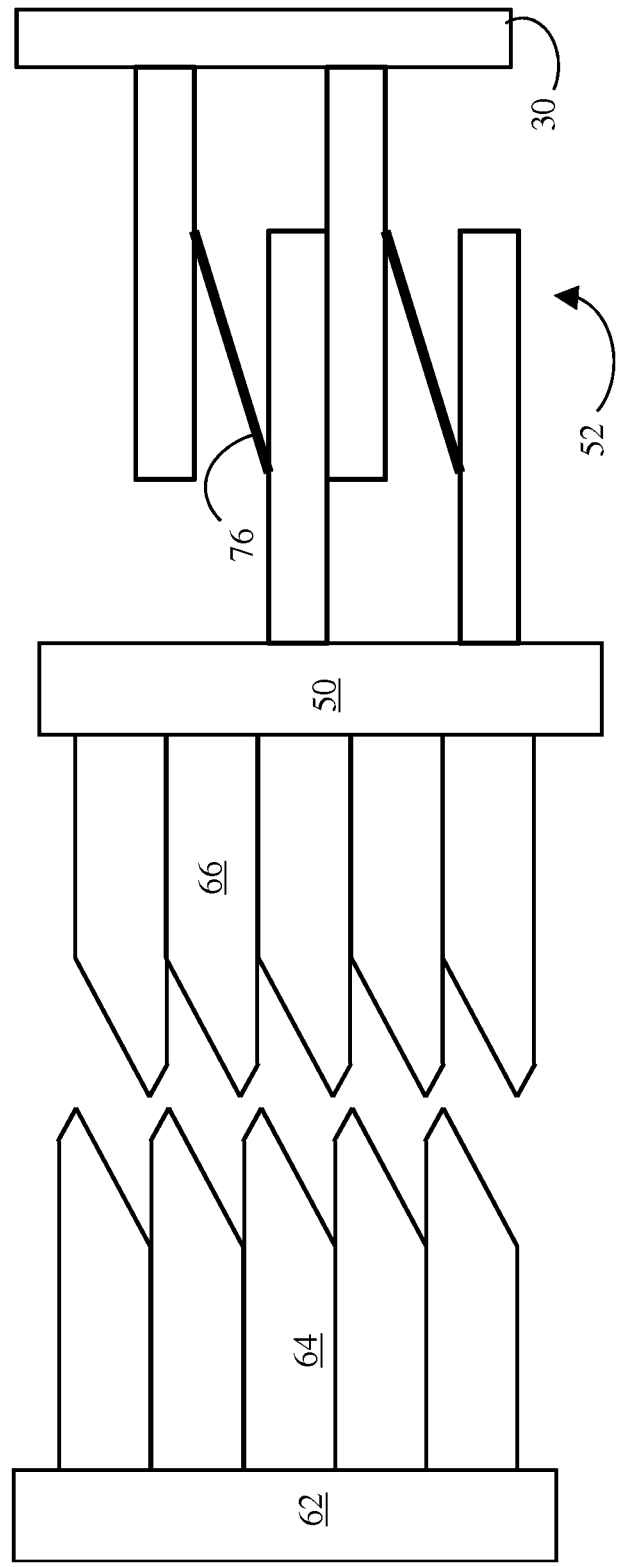
FIG. 7 is a top view of an alternative dog clutch embodiment suitable for use within the clutch assembly of FIG. 2 in a disengaged condition.

FIG. 7 illustrates an alternative embodiment that does not rely on the one way clutch to hold the inner race in one of a finite number of rotational positions when it transmits torque. The relationship between piston 50 and housing 30 as imposed by the spline connection 52 is shown in the right portion of the Figure for illustrative purposes although the spline may in practice be radially offset from the dog teeth. Spline 52 is designed to allow some relative rotation between piston 50 and housing 30. Bias springs 76 forces the piston to one extreme of this spline lash zone when the dog teeth are disengaged. If some relative rotation is required for dog teeth 66 to mesh with dog teeth 64 as the piston slides into the engaged position, the bias spring compresses to permit the necessary rotation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
   a planetary element configured to rotate about an axis and having a first plurality of teeth;
   a piston having a second plurality of teeth and configured to slide along the axis between a first position in which the first and second pluralities of teeth are axially separated and a second position in which the first and second pluralities of teeth intermesh to substantially prevent rotation of the element in a first direction; and
   a one-way-clutch configured to substantially prevent rotation of the element in a second direction without resisting the sliding motion of the piston.

2. The transmission of claim 1 further comprising a transmission case engaged with the piston such that pressurized fluid in the transmission case forces the piston to move from the first position to the second position.

3. The transmission of claim 1 further comprising a return spring configured to force the piston to move from the second position to the first position.

4. The transmission of claim 1 wherein the piston is configured to slide beyond the second position to a third position, wherein the first plurality of teeth engage the second plurality of teeth at a pressure angle, and wherein a tangent of the pressure angle is greater than a coefficient of friction between the teeth.

5. The transmission of claim 1 wherein the one-way-clutch is configured to preclude rotation of the element in the second direction across a finite number of rotational positions and wherein the first and second plurality of teeth are positioned to intermesh without engaging at each of the finite number of positions.

6. The transmission of claim 1 further comprising a bias spring configured to rotationally position the piston within a housing.

7. A clutch assembly comprising:
   first and second races having first and second pluralities of teeth respectively;
   a piston configured to slide between a first position in which the pluralities of teeth are axially separated and a second position in which the pluralities of teeth intermesh; and
   a one-way-clutch configured to substantially prevent relative rotation in one direction between the first and second races without resisting the sliding motion of the piston.

8. The clutch assembly of claim 7 further comprising a return spring configured to force the piston to move from the second position to the first position.

9. The clutch assembly of claim 7 wherein the piston is configured to slide beyond the second position to a third axial position, wherein the first plurality of teeth engage the second plurality of teeth at a pressure angle, and wherein a tangent of the pressure angle is greater than a coefficient of friction between the teeth.

10. The clutch assembly of claim 7 wherein the second race is configured to be continuously held against rotation.

11. The clutch assembly of claim 7 wherein the first race and the second race both rotate about a common axis.

* * * * *